United States Patent
Loth et al.

(10) Patent No.: US 8,703,879 B2
(45) Date of Patent: Apr. 22, 2014

(54) CONTINUOUS METHOD FOR MULTI-STAGED DRYING AND SUBSEQUENT CONDENSATION OF A POLYAMIDE GRANULATE

(75) Inventors: Wolfgang Loth, Bad Durkheim (DE); Faissal-Ali El-Toufaili, Ludwigshafen (DE); Achim Stammer, Freinsheim (DE); Gad Kory, Gaiberg (DE); Achim Gerstlauer, Limburgerhof (DE); Jens Becker, Eisenberg (DE)

(73) Assignee: BASF SE (DE)

( * ) Notice: Subject to any disclaimer, the term of this patent is extended or adjusted under 35 U.S.C. 154(b) by 133 days.

(21) Appl. No.: 12/999,988

(22) PCT Filed: Jun. 19, 2009

(86) PCT No.: PCT/EP2009/057673
§ 371 (c)(1),
(2), (4) Date: Dec. 17, 2010

(87) PCT Pub. No.: WO2009/153340
PCT Pub. Date: Dec. 23, 2009

(65) Prior Publication Data
US 2011/0092645 A1 Apr. 21, 2011

(30) Foreign Application Priority Data
Jun. 20, 2008 (EP) .................................... 08158668

(51) Int. Cl.
C08G 69/16 (2006.01)
C08G 69/46 (2006.01)
C08L 77/00 (2006.01)

(52) U.S. Cl.
USPC ................. 525/420; 525/52; 525/53; 525/54; 528/310; 528/312; 528/313; 528/321; 528/322; 528/323; 528/332; 528/335; 528/336; 528/340; 528/480; 528/483; 528/499; 528/503

(58) Field of Classification Search
USPC ........ 525/52, 53, 54, 420; 528/310, 312, 313, 528/321, 322, 323, 332, 335, 336, 340, 503, 528/480, 483, 499
See application file for complete search history.

(56) References Cited

U.S. PATENT DOCUMENTS

| | | |
|---|---|---|
| 3,449,220 A | 6/1969 | Geisler et al. |
| 4,439,933 A | 4/1984 | Dietrich et al. |
| 4,816,557 A | 3/1989 | Pipper et al. |
| 5,052,123 A * | 10/1991 | Tischendorf et al. ........... 34/418 |
| 5,590,479 A | 1/1997 | Ruf et al. |
| 5,596,070 A | 1/1997 | Gotz |
| 5,773,555 A | 6/1998 | Weger et al. |
| 6,754,979 B2 | 6/2004 | Ludwig et al. |
| 2010/0190934 A1 | 7/2010 | Desbois et al. |
| 2010/0190952 A1 | 7/2010 | Desbois et al. |
| 2010/0311918 A1 | 12/2010 | Toufaili |
| 2010/0317810 A1 | 12/2010 | Weiss |
| 2011/0144300 A1 | 6/2011 | Desbois et al. |

FOREIGN PATENT DOCUMENTS

| | | |
|---|---|---|
| DE | 2530304 | 7/1975 |
| DE | 4326105 | 8/1993 |
| EP | 348821 A2 | 1/1990 |
| EP | 732351 A2 | 9/1996 |
| EP | 1235671 A1 | 9/2002 |
| EP | 2007/090602 * | 8/2007 |
| GB | 2182668 A | 5/1987 |
| WO | WO01/39947 | 6/2001 |

OTHER PUBLICATIONS

U.S. Appl. No. 13/378,980, filed Dec. 16, 2011, Schmidt et al.
U.S. Appl. No. 13/139,133, filed Jun. 10, 2011, Christoph Plachetta.

* cited by examiner

*Primary Examiner* — Ana Woodward
(74) *Attorney, Agent, or Firm* — Novak Druce Connolly Bove + Quigg LLP

(57) ABSTRACT

A continuous process for the multistage drying and postcondensation of polyamide pellets in the solid phase comprises
1) carrying out the predrying process in a continuous drying apparatus which is operated in countercurrent mode or in crossflow mode with inert gas or steam, or with a mixture of inert gas and steam, using a pellet temperature in the range from 70 to 200° C., and
2) Carrying out the subsequent continuous postcondensation process in a separate vertical duct with moving bed at a pellet temperature in the range from 120 to 210° C., where the duct is operated in countercurrent mode with inert gas or steam, or with a mixture of inert gas and steam, the inert gas is introduced at least two sites along the duct, and from 15 to 90% of the inert gas is introduced at the base of the vertical duct and from 10 to 85% of the inert gas is introduced in the upper half below the surface of the pellets.

23 Claims, No Drawings

CONTINUOUS METHOD FOR MULTI-STAGED DRYING AND SUBSEQUENT CONDENSATION OF A POLYAMIDE GRANULATE

CROSS-REFERENCE TO RELATED APPLICATIONS

This application is a national stage application (under 35 U.S.C. §371) of PCT/EP2009/057673, filed Jun. 19, 2009, which claims benefit of European application 08158668.7, filed Jun. 20, 2008, the contents of each of which are incorporated herein by reference in their entireties.

FIELD OF THE INVENTION

The invention relates to a continuous process for the multistage drying and postcondensation of polyamide pellets in the solid phase, with the aim of producing nylon-6 and, respectively, PA6 copolymers with low residual monomer content.

BACKGROUND

Polyamides, in particular nylon-6, are typically pelletized after the polymerization/polycondensation process, and extracted with water in order to remove residual monomers and oligomers, and then dried. Postcondensation can optionally be carried out after the extraction process in order to increase molecular weight and, respectively, viscosity. The moisture deriving from the extraction process is removed here from the polymer pellets. Various processes for this are known.

EP-B-1 235 671 relates to a continuous process for the drying and postcondensation of pellets, and also to a system for conduct of the process. The process decouples drying and postcondensation, and the drying process is carried out in a crossflow apparatus. The resultant predried polyamide is then postcondensed in a vertical duct apparatus in countercurrent with a slow stream of nitrogen.

EP-B-0 732 351 relates to a process and an apparatus for the production of polyamides, where polyamide pellets produced through polycondensation in the melt are postcondensed in the solid phase. Here, the polyamide pellets are heated in a first step to a first temperature of from 70° C. to 150° C., kept for from two to six hours at said temperature, and then, in a second step, heated at a temperature which is higher, but below the melting point, being from 170° C. to 10° C. below the melting point, and postcondensed at this temperature. The postcondensation can be carried out in a stream of inert gas. The postcondensation is preferably carried out in a moving-bed reactor to which inert gas having at least two different temperatures is introduced at least two different sites. By way of example, nylon-6 is postcondensed first at a temperature of 150° C. and then at a temperature of 190° C. The introduction of the inert gas at two sites serves to generate the different temperatures.

BRIEF SUMMARY

It is an object of the present invention to provide a process for the continuous multistage drying and postcondensation of polyamide pellets which leads to better conduct of the process to give polyamide pellets with a desired viscosity and with desired low contents of water and of non-extracted monomer, and of oligomers. The postcondensation is thus intended to take place under the mildest possible conditions. The intention is to avoid any condensation of extracted monomer in parts of the system. This can lead to blockage of the system.

According to the invention, the object is achieved through a continuous process for the predrying and postcondensation of polyamide pellets in the solid phase, where
1) carrying out the predrying process in a continuous drying apparatus (e.g. a tower dryer, e.g. with moving bed, fluidized-bed dryer, or fluidized/pulsed-bed dryer) which is operated in countercurrent mode or in crossflow mode with inert gas or steam, or with a mixture of inert gas and steam, using a pellet temperature in the range from 70 to 200° C., and
2) the subsequent continuous postcondensation process is carried out in a separate vertical duct with moving bed at a pellet temperature which can be above, equal to or below the pellet temperature in stage (1), being in the range from 120 to 210° C., where the duct is operated in countercurrent mode with inert gas or steam, or with a mixture of inert gas and steam, the inert gas is introduced at least two sites along the duct, and from 15 to 90% of the inert gas is introduced at the base of the vertical duct and from 10 to 85% of the inert gas is introduced in the upper half, preferably in the upper third, below the surface of the pellets.

DETAILED DESCRIPTION OF THE PREFERRED EMBODIMENTS

According to the invention, it has been found that polyamide, in particular nylon-6, is obtainable with low contents of water and of monomers and at the same time with high viscosities when predrying and postcondensation are separated from one another in terms of apparatus, and during the predrying process and also during the postcondensation operations use is made of an inert gas stream or steam, or a mixture of inert gas and steam, where the inert gas stream or steam or the mixture of inert gas and steam is introduced at least two sites into the vertical duct during polycondensation. In contrast to this, according to EP-B-0 732 351 predrying and postcondensation are carried out in a single tower dryer, and inert gas streams are introduced into the reactor only at two sites, to permit setting of different temperature profiles along the vertical duct.

According to EP-B-1 235 671, the postcondensation uses only a slow stream of nitrogen in countercurrent mode. No mention is made of a temperature profile between predrying and postcondensation. It is stated that drying, and also postcondensation, are operated at a very high temperature level.

The process of the invention can treat any desired nylon pellets, for example of nylon-6, or of other polyamides or copolyamides, where these have extract residues, or else pellets of mixtures of aliphatic and (semi) aromatic (co)polyamides. It is particularly preferable to use nylon-6 pellets or nylon-6/6,6 copolymer pellets.

The predrying process (stage 1) is carried out at a pellet temperature in the range from 70 to 200° C., preferably from 120 to 180° C., in particular from 140 to 180° C.

The postcondensation is carried out at a pellet temperature which is above, below, or equal to the pellet temperature in stage (1). This pellet temperature in stage (2) is in the range from 120 to 210° C., preferably in the range from 160 to 180° C., in particular in the range from 165 to 175° C.

The temperature in stage (2) is selected as a function of the desired molecular weight and, respectively, the desired viscosity of the polyamide, and as a function of the residence time in the two stages. For higher viscosities and, respectively, higher molecular weights, higher temperatures are used.

The predrying process is preferably carried out at a pressure in the range from 1 to 10 bar abs., in particular in the range from 1 to 5 bar abs. The postcondensation is preferably carried out at a pressure in the range from 1 to 10 bar abs., in particular in the range from 1 to 5 bar abs. A superatmospheric pressure is generally set, to prevent ingress of air (oxygen).

According to the invention, the inert gas or steam and, respectively, the inert gas/steam mixture in stage (2) is introduced at least two sites along the vertical duct, where from 15 to 95% of the inert gas and, respectively, of the inert gas/steam mixture is introduced at the base of the duct, and from 5 to 85% of the inert gas and, respectively, of the inert gas/steam mixture is introduced in the upper third below the top of the vertical duct. In this process, the pellets move under gravity from the top of the vertical duct to its base, and are thus treated in countercurrent mode with inert gas or steam and, respectively, inert gas/steam mixture.

It is preferable that, in stage (2), from 30 to 90% of the inert gas or steam and, respectively, the inert gas/steam mixture, in particular from 50 to 85% of the inert gas or steam and, respectively, of the inert gas/steam mixture, is introduced at the base of the vertical duct, and that from 10 to 70%, particularly preferably from 15 to 50%, of the inert gas or steam, or inert gas/steam mixture is introduced in the upper half, e.g. in the upper third, or in the range from 1/8 to 3/8 of the length of the vertical duct below the surface of the pellets. Once the vertical duct has been completely filled, the top of the vertical duct and the surface of the pellets are at the same level. In one embodiment, the introduction of the inert gas and, respectively, of the inert gas/steam mixture takes place at the base of the vertical duct and at about 1/4 of the length of the vertical duct below the level of the pellets.

The vertical duct is preferably dimensioned in such a way that the gas velocity at the surface of the pellets does not reach the fluidization point.

The desiccant and, respectively, extractant used in stages (1) and (2) can comprise any desired suitable inert gases. It is preferable that steam, nitrogen, or a mixture thereof is used as desiccant in stage (1), and that nitrogen with steam content of from 0 to 90% by weight, preferably from 0 to 10% by weight, is used as desiccant and, respectively, extractant in stage (2). It is preferable that an oxygen-free desiccant and, respectively, extractant is used in stages 1 and 2.

In stage (1), it is preferable that from 1 to 20 kg of inert gas or steam and, respectively, inert gas/steam mixture, particularly preferably from 2 to 10 kg of inert gas and, respectively, inert gas/steam mixture are introduced per kg of polyamide.

In stage (2), it is preferable that from at least 0.5 kg of inert gas or steam and, respectively, inert gas/steam mixture, particularly preferably from 1 to 7 kg of inert gas and, respectively, inert gas/steam mixture are introduced into the vertical duct per kg of polyamide.

The inert gas and, respectively, inert gas/steam mixture passed respectively through the predrying process and through the postcondensation process can be discarded once it has been discharged. However, it is preferable that some or all of the inert gas and, respectively, inert gas/steam mixture is returned, after treatment, to the process.

It is preferable that the hydrous desiccant leaving the apparatus in stage (1) is treated and to some extent or entirely returned to the process.

The method of treatment is scrubbing at a temperature below 60° C., preferably below 45° C. To avoid raising the level of impurities in the inert gas, it is preferable that from 0.1 to 10% by weight, in particular about 1% by weight, of the desiccant leaving the apparatus in stage (1) is, if necessary, replaced by fresh desiccant.

When the hydrous desiccant and, respectively, the extractant comprising extract leaves the top of the vertical duct in stage (2), it is preferably treated and returned to some extent or entirely to the process. By way of example, from 0.1 to 10% by weight of the extractant leaving the vertical duct is replaced by fresh extractant. The method of treatment is analogous to stage 1, e.g. using scrubbing. The hydrous desiccant and, respectively, extractant comprising extract from stage (2) can optionally be used for heating/drying in stage (1).

In another embodiment, the desiccant from stage 1 is passed after treatment to stage 2.

The residence time of the pellets in stage (1) is preferably from 0.2 to 15 hours, particularly preferably from 0.5 to 10 hours.

The residence time in stage (2) is preferably from 5 to 80 hours, in particular from 20 to 40 hours.

The polyamide and, respectively, copolyamide used in the process can be prepared by any desired suitable processes. Reference may be made here by way of example to the processes described in EP-B-1 235 671, EP-B-0 732 351, EP-A-0 348 821, EP-A-0 702 047, EP-A-0 284 968. It is preferable that the nylon-6 pellets used in the process are obtained from a prepolymer obtained through reaction of caprolactam, optionally of comonomers, and water, in a precondensation tube, with or without upstream pressure reactor, pelletization and aqueous extraction of the resultant prepolymer, and removal of water.

In terms of apparatus, the drying and postcondensation processes can be designed and carried out as described in EP-B-1 235 671, for example. By way of example, a cross-flow dryer can be used in stage (1). As an alternative, a tower dryer, belt dryer, or fluidized-bed dryer can also be used in stage (1).

In stage (2), it is preferable that a tower dryer is used. There may be a cooling apparatus attached downstream of the tower dryer. The description and drawings of EP-B-1 235 671 give suitable geometries of the apparatuses.

Particular reference may be made here to the procedure using an active vertical duct, having an additional inert gas circuit, see paragraphs [0032] to [0037] of EP-B-1 235 671.

An achievable moisture level reduction (drying process for the purposes of the invention) for polyamide pellets generally gives values in the range from 0.02 to 4% by weight, from an initial moisture level of from about 1 to 15% by weight.

The content of residual monomers in the polyamide used in the predrying process and coming from the extraction process is in the range from greater than 0 to 0.08% by weight. It is preferable that the polyamide introduced into the predryer has less than 0.05 or 0.03% by weight of residual monomer and less than 0.1 or 0.08% by weight of residual cyclic dimer. According to one embodiment of the invention, the residual monomer content is greater at the end of stage 2 than at the start of stage 1.

The removal of monomers and dimers in the extraction process reliably prevents formation on the apparatuses of deposits which could eventually block the vertical ducts and the vapor line.

Stage (2) uses a separate vertical duct or tower dryer, through which the polyamide flows under gravity in a moving bed. The throughput and the condition of the pellets in the vertical duct can be used to establish a variety of residence times, and can be used together with the effect of various temperatures to produce products of different molecular weight. Atmospheric oxygen is advantageously excluded in the tower dryer, since it reacts with the hot polymer pellets, and this leads to discoloration in the finished product.

The upstream stage 1 is necessary inter alia in order to dissipate the residual moisture from the extraction process before the pellets pass into the tower dryer (stage 2). Otherwise, the heat of evaporation required could lower the gas temperature to below the condensation temperature of the vapors, and the pellets would cake.

The decoupling of drying process and postcondensation process permits the two process steps to be operated at individually set temperature levels. Furthermore, the respective pellet residence time can be varied. Different residence times can be achieved for identical total mass flow through dimensioning and through the fill level of predryer and postcondenser.

A surprisingly marked reduction of monomer build-up in the polyamide pellets is achieved in comparison with the conventional process. By way of example, a nylon-6 with very low caprolactam content can be produced, with the corresponding technical performance advantages, in particular control of fuming during the spinning process in fiber production, or of deposit formation on moldings during injection molding, or of deposits on rolls during foil production.

Examples are used below for further explanation of the process.

EXAMPLES

General Method of Production

Nylon-6 pellets are used, produced in accordance with the specification in DE-A-01545221, with the following properties:
Table of Properties of Product Used

| REC [%] | IV [ml/g] | RM [%] | EG ($NH_2$) [mmol/kg] | Mono [%] | Mono [ppm] |
|---|---|---|---|---|---|
| 0.27 | 137 | 11.2 | 54.1 | 0.010 | 100 |

Abbreviations:
RM=Residual moisture level
REC=Residual extract content (total of caprolactam and oligomers)
IV=Intrinsic viscosity
EG=End group content ($NH_2$)
Mono=Monomer content
Laboratory-Scale Production The predrying process was carried out on laboratory scale in an oven with nitrogen flushing, into which the pellets had been placed on a dish, with a nitrogen flow rate of 200 l/h. The temperature was 110° C., and the drying time was 7 hours. This gave a predried product with the following properties:
Table of Properties of Predried Product

| REC [%] | IV [ml/g] | RM [%] | EG ($NH_2$) [mmol/kg] | Mono [%] | Mono [ppm] |
|---|---|---|---|---|---|
| 0.32 | 152 | 2.85 | 51.6 | 0.010 | 100 |

The laboratory-scale postcondensation process was carried out as follows:

A double-walled tube of length 1000 mm was used, and this was replenished every two hours by way of a heated valve with fresh nylon-6 pellets, which were discharged batchwise at the other end of the twin-walled tube by way of a controllable discharge screw. Operations used a countercurrent of heated nitrogen and, respectively, of a nitrogen-steam mixture, the inert gas being introduced below into the twin-walled tube and additionally in the upper half of the length of the tube below the top. The maximum temperature of the nitrogen-steam mixture was 180° C., and the maximum pressure was 1.4 bar.

As a function of desired residence time, a prescribed amount of pellets was input by way of the solids valve within a certain time, and the corresponding amount was in turn discharged simultaneously by way of the discharge screw. The pellets were heated by way of the inert gas stream. Starting at a pellet temperature of 140° C., the desired amount of water was, if appropriate, input into the nitrogen stream.

The inert gas stream was divided, and from 33 to 85% of the inert gas (nitrogen) was input at the base, and from 15 to 67% of the inert gas was input in the upper half and, respectively, in the upper third.

The residual moisture level of the polyamide specimens was determined in a Karl Fischer apparatus.

To determine intrinsic viscosity (IV), a 0.5% strength (m/v) solution of the polyamide specimen was prepared in 96±0.1% strength sulfuric acid. The flow times of the specimen solution and of the solvent were determined at 25.0±0.05° C. water bath temperature in an Ubbelohde viscometer, and these values were used to calculate intrinsic viscosity and, respectively, relative viscosity.

Residual monomer content and, respectively, extract content was determined chromatographically. A titration method was used to determine end group content.

Inventive Example 1

The pellets were heat-conditioned at 165° C. The pellet flow rate was 180 g/h, and 0.2 standard $m^3$/h of nitrogen with 6% of moisture level was fed in at the base of the tower. 0.4 standard $m^3$/h of nitrogen with 6% moisture level was fed in at the middle of the tower.

The resultant properties were as follows:
Table of Properties of Conditioned Product

| Time [h] | REC [%] | IV [ml/g] | RM [%] | EG ($NH_2$) [mmol/kg] | Mono [%] | Mono [ppm] |
|---|---|---|---|---|---|---|
| 5.5 | 0.30 | 168 | 0.725 | 48.8 | 0.060 | 600 |
| 16 | 0.32 | 201 | 0.024 | 40.0 | 0.14 | 1400 |
| 20 | 0.33 | 208 | 0.02 | 38.6 | 0.15 | 1500 |
| 25 | 0.33 | 221 | 0.164 | 36.2 | 0.150 | 1500 |

Abbreviations:
RM=Residual moisture level
REC=Residual extract content (total of caprolactam and oligomers)
IV=Intrinsic viscosity
EG=End group content ($NH_2$)
Mono=Monomer content It is seen that a product with moderate intrinsic viscosity and with residual monomer contents less than or equal to 1500 ppm can be achieved.

Inventive Example 2

The pellets were heat-conditioned at 165° C. The pellet flow rate was 180 g/h, and 0.2 standard $m^3$/h of nitrogen was fed in at the base of the tower. 0.4 standard m³/h of nitrogen was fed in at the middle of the tower.

The resultant properties were as follows:
Table of Properties of Conditioned Product

| Time [h] | REC [%] | IV [ml/g] | RM [%] | EG (NH$_2$) [mmol/kg] | Mono [%] | Mono [ppm] |
|---|---|---|---|---|---|---|
| 26 | 0.29 | 233 | 0.01 | 37.8 | 0.120 | 1200 |

It is seen that a product with moderate intrinsic viscosity and 1200 ppm of residual monomer can be achieved.

Inventive Example 3

The pellets were heat-conditioned at 173° C. The pellet flow rate was 180 g/h, and 0.2 standard m³/h of nitrogen was fed in at the base of the tower. 0.3 standard m³/h of nitrogen was fed in at the middle of the tower.

The resultant properties were as follows:
Table of Properties of Conditioned Product

| Time [h] | REC [%] | IV [ml/g] | RM [%] | EG (NH$_2$) [mmol/kg] | Mono [%] | Mono [ppm] |
|---|---|---|---|---|---|---|
| 7 | 0.30 | 187 | 0.01 | 44.3 | 0.11 | 1100 |
| 14 | 0.31 | 212 | 0.010 | 41.3 | 0.14 | 1400 |
| 26 | 0.31 | 253 | 0.010 | 35.8 | 0.12 | 1200 |

It is seen that a product with high intrinsic viscosity and with residual monomer contents less than 1500 ppm can be achieved.

Inventive Example 4

The pellets were heat-conditioned at 165° C. The pellet flow rate was 180 g/h, and 0.2 standard m³/h of nitrogen with 1.3% of moisture level was fed in at the base of the tower. 0.4 standard m³/h of nitrogen with 1.3% moisture level was fed in at the middle of the tower.

The resultant properties were as follows:
Table of Properties of Conditioned Product

| Time [h] | REC [%] | IV [ml/g] | RM [%] | EG (NH$_2$) [mmol/kg] | Mono [%] | Mono [ppm] |
|---|---|---|---|---|---|---|
| 5.5 | 0.28 | 179 | 0.018 | 45.5 | 0.090 | 900 |
| 9 | 0.30 | 193 | 0.018 | 42.9 | 0.12 | 1200 |
| 25 | 0.32 | 231 | 0.02 | 36.0 | 0.130 | 1300 |

It is seen that a product with moderate intrinsic viscosity and with residual monomer contents less than 1400 ppm can be achieved.

Comparative Examples without Predrying

For comparison with the novel process, undried polyamide pellets with the following properties were heat-conditioned:
Table of Properties of Conditioned Product

| REC [%] | IV [ml/g] | RM [%] | EG (NH$_2$) [mmol/kg] | Mono [%] | Mono [ppm] |
|---|---|---|---|---|---|
| 0.27 | 137 | 11.2 | 54.1 | 0.010 | 100 |

Example 5

Comparison

The pellets were heat-conditioned at 173° C. The pellet flow rate was 200 g/h, and 1.7 standard m³/h of nitrogen with 3.8% moisture level was introduced at one site within the tower at about ¼ of the length of the tower below the top of the tower.

The resultant properties were as follows:
Table of Properties of Conditioned Product

| Time [h] | REC [%] | IV [ml/g] | RM [%] | EG (NH$_2$) [mmol/kg] | Mono [%] | Mono [ppm] |
|---|---|---|---|---|---|---|
| 27 | 0.61 | 230 | 0.19 | 34.2 | 0.43 | 4300 |

In comparison with the process of the invention (approximating to Inventive Example 3), it is seen that a product with lower intrinsic viscosity and with distinctly higher residual monomer content is obtained.

Example 6C

Comparison

The pellets were heat-conditioned at 165° C. The pellet flow rate was 200 g/h, and 1.7 standard m³/h of nitrogen with 3.8% moisture level was introduced at one site within the tower at about ¼ of the length of the tower below the top of the tower.

The resultant properties were as follows:
Table of Properties of Conditioned Product

| Time [h] | REC [%] | IV [ml/g] | RM [%] | EG (NH$_2$) [mmol/kg] | Mono [%] | Mono [ppm] |
|---|---|---|---|---|---|---|
| 27 | 0.49 | 210 | 0.43 | 37.1 | 0.33 | 3300 |

In comparison with the process of the invention (approximating to Inventive Example 4), it is seen that a product with lower intrinsic viscosity and with higher residual monomer content is obtained.

We claim:
1. A continuous process for the multistage predrying and post condensation of polyamide pellets in the solid phase, which comprises
   1) carrying out a predrying process in a continuous drying apparatus which is operated in countercurrent mode with inert gas and by maintaining the temperature of the polyamide pellets in the range from 140 to 180° C., and
   2) carrying out a subsequent continuous postcondensation process in a second apparatus comprising a vertical duct with moving bed at a temperature of the polyamide pellets in the range from 120 to 210° C., where the duct is operated in countercurrent mode with an inert gas, wherein the inert gas is introduced at least two sites along the duct, and from 15 to 90% of the inert gas is introduced at the base of the vertical duct and from 10 to 85% of the inert gas is introduced in the upper half of the length of the vertical duct below the surface of the pellets.
2. The process according to claim 1, wherein the polyamide pellets are nylon-6 pellets or nylon-6/6,6 copolymer pellets.

3. The process as claimed in claim 2, wherein the nylon-6 pellets used in the process are obtained through reaction of caprolactam and water in a precondensation tube with upstream pressure reactor, to give a prepolymer, pelletization and aqueous extraction of the resultant prepolymer, and subsequent removal of water.

4. The process as claimed in claim 2, wherein the nylon-6 pellets or the nylon-6/6,6 copolymer pellets used in the process are obtained through reaction of caprolactam and water for the nylon-6 pellets or, with comonomers for the nylon 6/6,6 copolymer pellets, in a precondensation tube with upstream pressure reactor, to give a prepolymer, pelletization and aqueous extraction of the resultant prepolymer, and subsequent removal of water.

5. The process as claimed in claim 2, wherein the nylon-6 pellets used in the process are obtained through reaction of caprolactam and water in a precondensation tube without upstream pressure reactor, to give a prepolymer, pelletization and aqueous extraction of the resultant prepolymer, and subsequent removal of water.

6. The process as claimed in claim 2, wherein the nylon-6 pellets or the nylon-6/6,6 copolymer pellets used in the process are obtained through reaction of caprolactam and water for the nylon-6 pellets or, with comonomers for the nylon 6/6,6 copolymer pellets, in a precondensation tube without upstream pressure reactor, to give a prepolymer, pelletization and aqueous extraction of the resultant prepolymer, and subsequent removal of water.

7. The process according to claim 1, wherein the postcondensation is carried out at a pellet temperature in the range from 160 to 180° C.

8. The process according to claim 1, wherein, in stage (2), from 50 to 85% of the inert gas is introduced at the base of the vertical duct and from 15 to 50% of the inert gas is introduced in the region from ⅛ to ⅜ of the vertical duct length below the surface of the pellets.

9. The process according to claim 1, wherein, in stage (1), nitrogen is used as a desiccant, and, in stage (2), nitrogen is used as an extractant.

10. The process according to claim 9, wherein, in stage (2), the extractant leaving the vertical duct is subjected to scrubbing at a temperature below 60° C. and then returned to the process.

11. The process according to claim 9, wherein, in stage (2), the extractant leaves the vertical duct, from 0.1 to 10% by weight of the extractant leaving the vertical duct is replaced by fresh extractant which is returned, after undergoing a scrubbing process, to the continuous process for the multistage drying and postcondensation of polyamide pellets.

12. The process according to claim 1, wherein, in stage (2), at least 0.5 kg of inert gas per kg of polyamide is introduced into the vertical duct.

13. The process as claimed in claim 1, wherein stage (1) is carried out in a tower dryer, fluidized-bed dryer, or fluidized/pulsed-bed dryer.

14. The process according to claim 1, wherein the predrying process is carried out for about 7 hours.

15. The process according to claim 1, wherein the postcondensation is carried out at a maximum pressure of 1.4 bar.

16. The process according to claim 1, wherein the residence time of the pellets in stage (1) is from 0.5 to 10 hours and in stage (2) is from 20 to 40 hours.

17. The process according to claim 1, wherein the inert gas is nitrogen, and wherein 0.2 standard m3/h of inert gas is introduced at the base of the vertical duct and from 0.3 to 0.4 standard m3/h of inert gas is introduced in the upper half of the length of the vertical duct below the surface of the pellets.

18. The process according to claim 1, wherein the inert gas is nitrogen.

19. The process according to claim 1, wherein the postcondensation is carried out at a maximum pressure of 1.4 bar and wherein 0.2 standard m3/h of nitrogen with 6% moisture level is introduced at the base of the vertical duct and 0.4 standard m3/h of nitrogen with 6% moisture level is introduced in the upper half of the length of the vertical duct below the surface of the pellets.

20. A continuous process for the multistage predrying and postcondensation of polyamide pellets in the solid phase, which comprises
  1) carrying out a predrying process in a continuous drying apparatus which is operated in countercurrent mode with inert gas and by maintaining the temperature of the polyamide pellets in the range from 140 to 180° C., wherein the inert gas is not steam, and
  2) carrying out a subsequent continuous postcondensation process in a second apparatus comprising a vertical duct with moving bed at a temperature of the polyamide pellets in the range from 120 to 210° C., where the duct is operated in countercurrent mode with an inert gas, or with a mixture of the inert gas and steam, wherein the inert gas is introduced to at least two sites along the duct, and from 15 to 90% of the inert gas is introduced at the base of the vertical duct and from 10 to 85% of the inert gas is introduced in the upper half of the length of the vertical duct below the surface of the pellets.

21. The process according to claim 20, wherein the inert gas is nitrogen.

22. A continuous process for the multistage predrying and post condensation of polyamide pellets in the solid phase, which comprises
  1) carrying out a predrying process in a continuous drying apparatus which is operated in crossflow mode with inert gas and by maintaining the temperature of the polyamide pellets in the range from 140 to 180° C., and
  2) carrying out a subsequent continuous postcondensation process in a second apparatus comprising a vertical duct with moving bed at a temperature of the polyamide pellets in the range from 120 to 210° C., where the duct is operated in countercurrent mode with an inert gas, wherein the inert gas is introduced at least two sites along the duct, and from 15 to 90% of the inert gas is introduced at the base of the vertical duct and from 10 to 85% of the inert gas is introduced in the upper half of the length of the vertical duct below the surface of the pellets.

23. A continuous process for the multistage predrying and postcondensation of polyamide pellets in the solid phase, which comprises
  1) carrying out a predrying process in a continuous drying apparatus which is operated in crossflow mode with inert gas and by maintaining a temperature of the polyamide pellets in the range from 140 to 180° C., wherein the inert gas is not steam, and
  2) carrying out a subsequent continuous postcondensation process in a second apparatus comprising a vertical duct with moving bed at a temperature of the polyamide pellets in the range from 120 to 210° C., where the duct is operated in countercurrent mode with an inert gas, or with a mixture of the inert gas and steam, wherein the inert gas is introduced to at least two sites along the duct, and from 15 to 90% of the inert gas is introduced at the base of the vertical duct and from 10 to 85% of the inert gas is introduced in the upper half of the length of the vertical duct below the surface of the pellets.

* * * * *